March 27, 1934.  A. NEVEU  1,952,386

FLUID PRESSURE BRAKE

Filed Jan. 9, 1931  3 Sheets-Sheet 3

INVENTOR.
ANSELME NEVEU
BY Wm. M. Cady
ATTORNEY.

Patented Mar. 27, 1934

1,952,386

UNITED STATES PATENT OFFICE 1,952,386

FLUID PRESSURE BRAKE

Anselme Neveu, Livry-Gargan, France, assignor to The Westinghouse Air Brake Company, Wilmerding, Pa., a corporation of Pennsylvania Application January 9, 1931, Serial No. 507,591
In Great Britain January 18, 1930

16 Claims. (Cl. 303—74)

This invention relates to fluid pressure braking apparatus of the kind in which the supply of fluid under pressure to and its release from the brake cylinder of the apparatus is arranged to be controlled in accordance with variations in brake pipe pressure by means of a controlling valve device preferably embodying a control chamber containing fluid at a substantially constant pressure or its equivalent.

Various forms of controlling valve devices of this character have heretofore been proposed, one of which forms is shown and described in my pending application filed September 18, 1930, and serially numbered 482,782, and this form is adapted to effect a graduated release of the brakes in accordance with the degree of restoration of brake pipe and auxiliary reservoir pressures towards the standard pressure obtaining for instance in the control chamber which is intended to remain substantially constant under all conditions of braking.

In certain circumstances, however, it may happen that the restoration of the brake pipe pressure to the full extent possible fails to effect absolute equality between the auxiliary reservoir pressure and the standard or control chamber pressure owing for instance to the control chamber having become overcharged or due to the restored brake pipe pressure being different at different times. Under these conditions difficulty may occur in effecting the final stage of the release of the brakes that is to say in effecting the final release to the atmosphere of the fluid contained in the brake cylinder at the end of a graduated release.

The present invention has for one object to overcome this disadvantage and according to the principal feature of the invention, an improved valve device is provided adapted to control communication between the brake cylinder and the atmosphere in such a manner that this communication is established as soon as a predetermined relation exists between the pressure in the brake cylinder and auxiliary reservoir respectively which is independent of the standard or control chamber pressure, while for a different predetermined relation between these pressures the communication above referred to is interrupted.

In a preferred form of the invention the valve device also controls communication between the brake pipe, the auxiliary reservoir and the control chamber in the same manner.

Other objects and advantages will appear in the following more detailed description of my invention.

The invention is illustrated by way of example in the accompanying drawings Figures 1, 2, 3, 4 and 5 of which are somewhat diagrammatic sectional views of various forms of valve devices embodying the invention.

Figure 1:
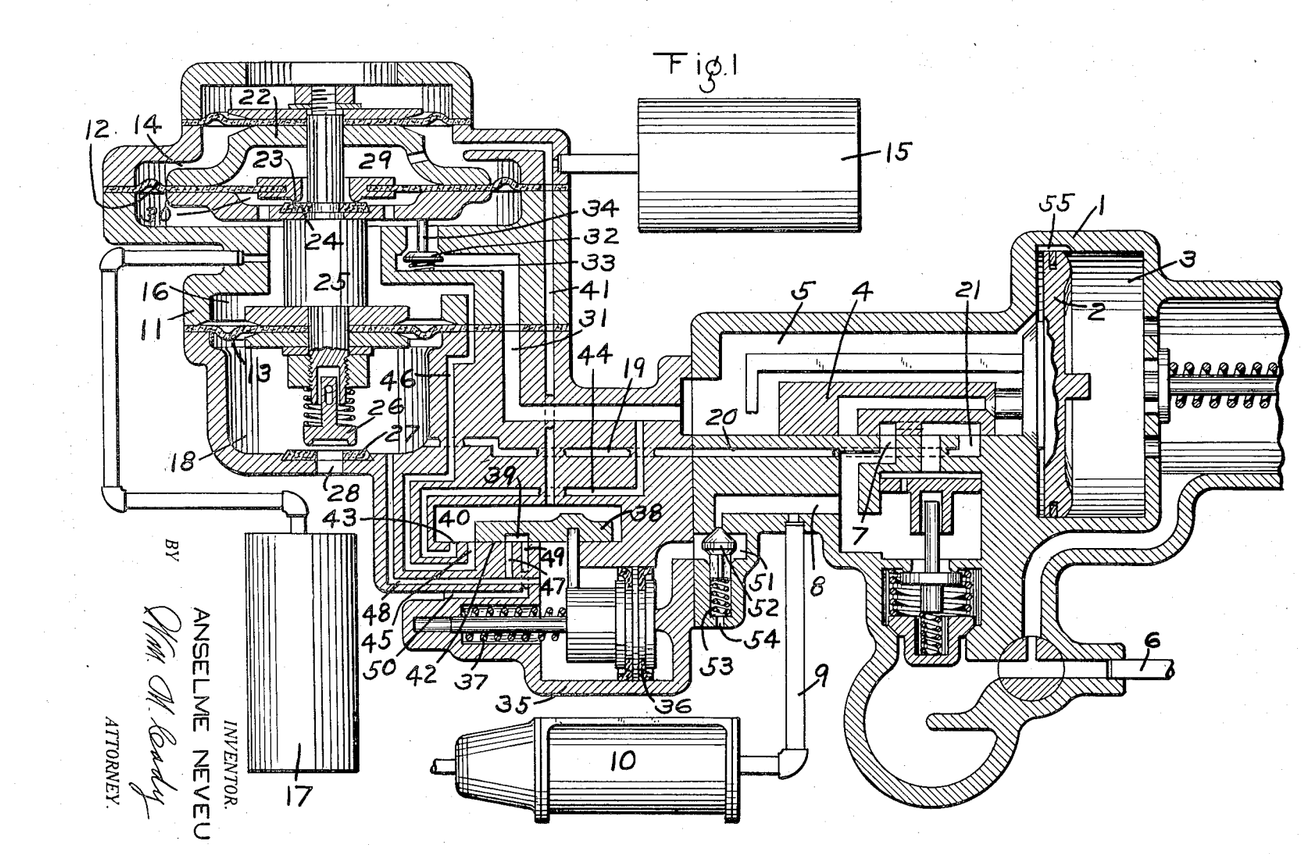

Referring now to the form of valve device shown in Fig. 1, it is preferably shown associated with a triple valve device 1 comprising the usual triple valve piston 2 adapted to move in a piston chamber 3 so as to operate a slide valve 4 contained in a valve chamber 5. The piston chamber 3 is in communication with the brake pipe 6 and the triple valve controls the supply of fluid under pressure from the valve chamber 5 to a port 7 in the slide valve seat communicating through a passage 8 and a pipe 9 with the brake cylinder 10.

The graduated release valve 11 is mounted on one end of the triple valve 1 and comprises a casing divided into three chambers or compartments by means of a larger diaphragm 12 and a smaller diaphragm 13. The chamber 14 above the diaphragm 12 is permanently in communication with a control reservoir 15, while the middle chamber 16 between the diaphragms 12 and 13 is permanently in communication with the auxiliary reservoir 17 of the apparatus. The lower chamber 18 communicates by means of a passage 19 in the casing of the graduated release valve 11 with a special passage 20 formed in the triple valve casing and leading to the triple valve exhaust port 21.

Mounted upon the upper diaphragm 12 is an internal casing or box 22, the diaphragm 12 extending within the interior of the box 22 and being provided with an annular valve member 23 carried by the diaphragm and adapted normally to engage with a gasket 24 mounted upon the base of the box 22. The latter is secured to a valve stem 25 traversing and secured to the lower diaphragm 13, the portion of the stem 25 projecting below the diaphragm 13 carrying a spring controlled valve member 26 adapted to engage with a gasket 27 surrounding an opening 28 in the base of the lower chamber 18.

It will be seen that the central portion of the diaphragm 12 divides the interior of the box 22 into an upper chamber 29 communicating with the chamber 14 leading to the control reservoir 15 and a lower chamber 30 communicating with the chamber 16. The chamber 16 is arranged to communicate with a passage 31 leading to the valve chamber 5 of the triple valve, this communication being controlled by a check valve 32 adapted to be held closed by a light spring 33. The valve 32 is provided with an upwardly projecting stem 34 adapted under certain conditions to be engaged by the base of the box 22 so as to hold the valve 32 open.

The valve device for controlling the final venting of the brake cylinder 10 comprises a cylindrical casing 35 containing a piston 36 adapted normally to be maintained in the position shown by means of a light spring 37. The piston 36 is arranged to operate a slide valve 38 provided with a cavity 39 and adapted to move in a valve chamber 40 which communicates by means of a passage 41 with the control reservoir 15. The slide valve 38 cooperates with a valve seat 42 containing a port 43 communicating through a passage 44 with the passage 31 and a port 45 communicating through a passage 46 with the chamber 16.

The valve seat 42 also contains a port 47 communicating with a passage 48 leading from the interior of the casing 35 on the left-hand side of the piston 36 to the chamber 18 and a port 49 leading to an exhaust port 50.

Interposed in a passage 51 leading from the interior of the casing 35 on the right-hand side of the piston 36 is a double-beat valve 52 normally maintained in the position shown by means of a spring 53. Under these conditions the passage 51 communicates with the atmosphere through an exhaust port 54, communication between the passages 51 and 8 being cut off.

In operation, the various parts of the apparatus are shown in the position they would occupy after the release of the brakes had been effected and while the auxiliary reservoir 17 is being recharged with fluid under pressure from the brake pipe.

The triple valve piston 2 is in its release position and fluid is being supplied from the brake pipe 6 through piston chamber 3 and leakage groove 55 to the valve chamber 5. From the valve chamber 5 fluid flows through passage 31 past the open valve 32 to the chamber 16 and thence to the auxiliary reservoir 17. Fluid under pressure is also being supplied to the auxiliary reservoir 17 from the passage 31 by way of passage 44, port 43, valve chamber 40, port 45 and passage 46 to chamber 16 and fluid is being supplied to the control reservoir 15 from valve chamber 40 by way of passage 41. The brake cylinder 10 is in communication with the atmosphere through pipe 9, passage 8, triple valve exhaust 21, passages 20 and 19, chamber 18 and opening 28.

The interior of the casing 35 to the left of the piston 36 is in communication with the atmosphere, by way of the passage 48, port 47, cavity 39, port 49 and exhaust port 50 and also by way of passage 48, chamber 18 and opening 28.

As soon as the pressure in the auxiliary reservoir 17 has been restored to its normal value this pressure in the chamber 16 acting upon the diaphragm 12 will cause the two diaphragms 12 and 13, the stem 25 and the box 22 to move upwards to a small extent, thus permitting the valve 32 to close under the action of the spring 33.

When an application of the brakes is effected in the ordinary manner by reducing the pressure in the brake pipe 6, the triple valve piston 2 and slide valve 4 move towards the right, thereby cutting off communication between the brake cylinder port 7 and the exhaust port 21 and establishing communication between the valve chamber 5 and the brake cylinder port 7 through the slide valve 4.

Fluid under pressure is thereupon supplied from the valve chamber 5 to the brake cylinder 10 by way of passage 8 and pipe 9. Owing to the consequent reduction in pressure in the valve chamber 5, the valve 32 opens and permits the flow of fluid from the auxiliary reservoir 17 by way of chamber 16 to supply the brake cylinder 10.

The brake cylinder pressure acting upon the valve 52 causes this valve to move to its lower position cutting off communication between the right hand side of the interior of the casing 35 and the atmosphere and establishing communication between the passages 8 and 51. Fluid at brake cylinder pressure thus acts upon the right hand side of the piston 36 which is moved towards the left, carrying with it the slide valve 38. The cavity 39 in the slide valve 38 consequently no longer establishes communication between the ports 47 and 49, and the ports 43 and 45 leading to the passage 31 and to the chamber 16 respectively are lapped by the slide valve 38. Communication between the auxiliary reservoir 17 and the control reservoir 15 is thus cut off.

Owing to the reduction in the pressure in the auxiliary reservoir 17 due to the flow of fluid to the brake cylinder 10, the control reservoir pressure in the chamber 14 acting on the upper side of the diaphragm 12 predominates over the reduced auxiliary reservoir pressure in the chamber 16 and causes the diaphragms 12 and 13 to move downwards, carrying with them the stem 25 so as to cause the valve member 26 to engage with the gasket 27 and thereby cut off communication between the chamber 18 and the atmosphere through the opening 28. This downward movement of the diaphragm also causes the box 22 to engage with the stem 34 of the valve 32 and hold this valve in its open position as shown in Figure 1.

The parts of the apparatus remain in the position above described until the brake pipe pressure is restored towards its normal value to effect a partial or graduated release of the brakes. When this occurs the triple valve piston 2 and slide valve 4 return to the position shown in Figure 1 and communication is again established between the brake cylinder port 7 and the triple valve exhaust port 21.

Fluid under pressure consequently flows from the brake cylinder 10, through pipe 9, passage 8, ports 7 and 21, and passages 20 and 19 to the chamber 18. Fluid under pressure is being simultaneously supplied from the brake pipe 6 to the auxiliary reservoir 17 by way of valve chamber 5 and passage 31 and the combined action of the brake cylinder pressure in the chamber 18 and the increasing auxiliary reservoir pressure in the chamber 16 overcomes the opposing control reservoir pressure in chamber 14 and causes the diaphragms 12 and 13 to move upwards and thereby raise the valve member 26 and permit spring 33 to seat valve 32 and cut off the supply of fluid under pressure from passage 31 to chamber 16 and the auxiliary reservoir 17. Fluid will thus be released from the brake cylinder 10 by way of the passages 20 and 19, chamber 18 and the opening 28 until the brake cylinder pressure is reduced an amount proportional to the increase in auxiliary reservoir pressure at which time the valve member 26 will again become seated by the control reservoir pressure in chamber 14 and thus interrupt the release of fluid from the brake cylinder 10.

It will be understood that since the opening and closing movements of the valve member 26 are dependent upon the relation of the brake cylinder pressure to the restored auxiliary reservoir pressure, the graduation of the release of the brakes will be accurately controlled in accordance with the degree of restoration of the brake pipe pressure towards its normal value.

The graduated release of fluid from the brake cylinder 10 will continue in the manner above described until the brake cylinder pressure has been reduced to a predetermined low degree, at which time, the effort exerted by spring 53 will predominate over the brake cylinder pressure acting upon the upper face of valve 52 and spring 53 will then move the valve 52 to its upper seated position in which fluid under pressure will be vented from the chamber at the right hand side of piston 36. The chamber at the opposite side of said piston being supplied with fluid under pressure from the brake cylinder 10 by way of chamber 18 and passage 48, the pressure of fluid in said chamber, assisted by the light spring 37, will then return the piston 36 and slide valve 38 to their normal position shown in the drawings, in which position the brake cylinder 10 will be finally vented to the atmosphere, independently of the position of the valve member 26, by way of chamber 18, passage 48, port 47, cavity 39, port 49 and exhaust port 50.

It will thus be evident that the final release of fluid from the brake cylinder will with this form of valve device be effected when the brake cylinder pressure has attained a predetermined low value.

Spring 37 is merely a light bias spring for normally maintaining the piston 36 in the position shown in the drawings and it is not intended that the effort of said spring be sufficient to move the piston 36 and slide valve 38 when said slide valve is subject to control reservoir pressure in chamber 40, but the movement of said piston depends, as above described, upon brake cylinder pressure acting upon one side or the other and the effort of said spring is not necessary to this operation.

It will be understood that, regardless of the position of the slide valve 38, if the pressure in the control reservoir 15 and in the chamber 14 communicating therewith, should fall below the auxiliary reservoir pressure in the chamber 16, the central portion of the diaphragm 12 within the box 22 will be moved upwards and will raise the valve member 23 out of engagement with the gasket 24 and thus permit the recharging of the control reservoir 15 from the auxiliary reservoir 17, the valve member 23 and its cooperating gasket 24 thus serving as an automatic check valve for this purpose.

It will be evident that the graduated release valve device shown in Figure 1 can be readily applied to any usual type of triple valve by providing the additional passage 20 in the triple valve casing leading to the triple valve exhaust port 21.

Figure 2:
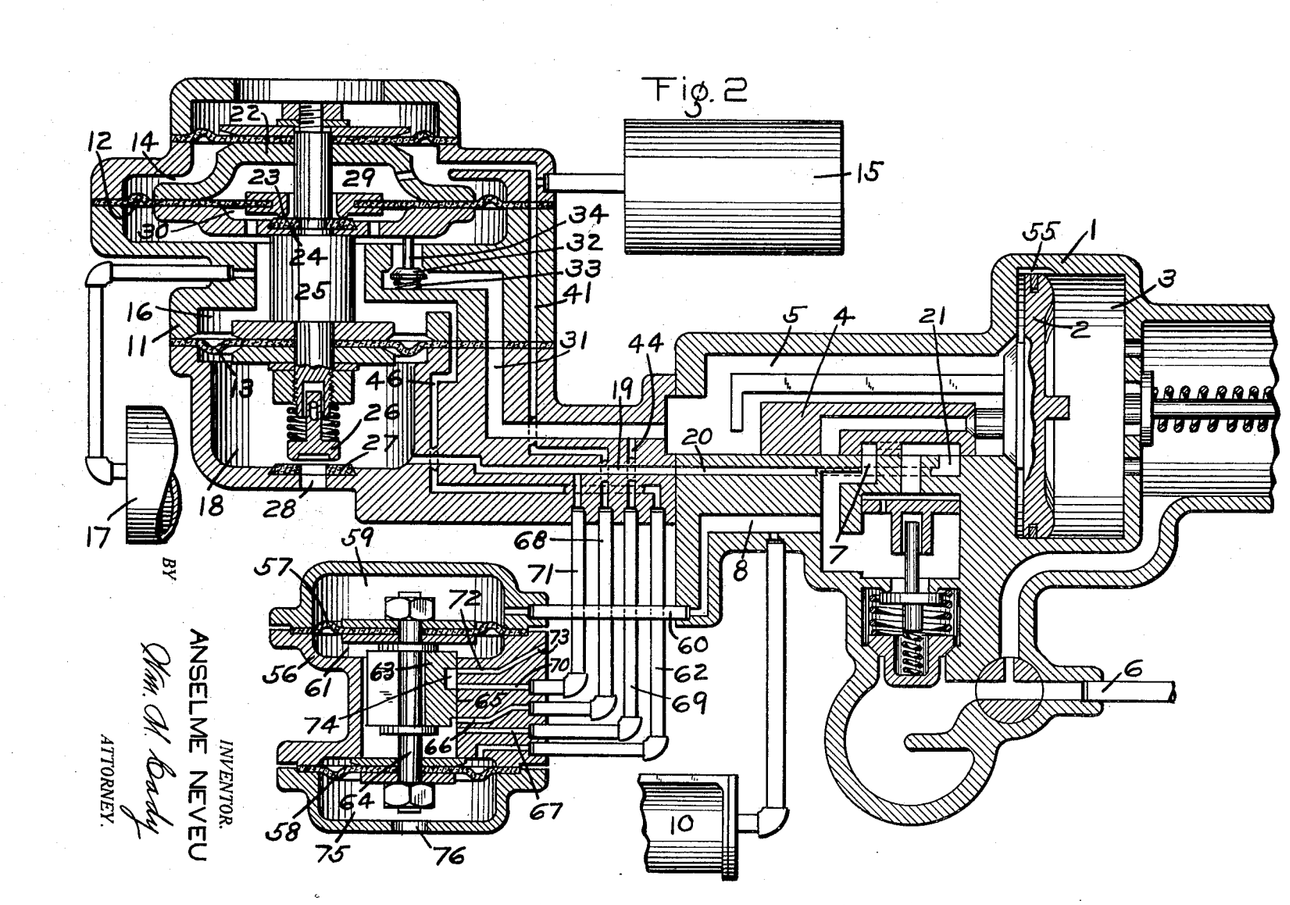

In Fig. 2 of the drawings is shown another form of valve device for controlling the final venting of the brake cylinder 10, said valve device being preferable associated with the triple valve device 1 and graduated release valve device 11 of Fig. 1 in the manner shown.

In the form shown in Fig. 2, the final brake cylinder release valve device comprises a casing 56 divided internally into three chambers or compartments by means of upper and lower diaphragms 57 and 58, respectively, of which the effective area of the diaphragm 57 is greater than the corresponding area of the diaphragm 58. The upper chamber 59 above the upper diaphragm 57 is in permanent communication by means of a pipe connection 60 with the brake cylinder 10 of the apparatus, the middle chamber 61 between the diaphragms 57 and 58 being similarly in communication through a pipe connection 62 and 46 with the auxiliary reservoir 17. The middle chamber 61 contains a slide valve 63 adapted to be operated by a stem 64 connected to the diaphragms 57 and 58, the seat 65 of the slide valve 63 being provided with two ports 66 and 67 leading through pipe connections 68 and 69 to passage 41 from the control chamber 15 and to passage 31 from the triple valve chamber 5, respectively, the ports 66 and 67 being, in the release position of the valve device shown in Figure 2, uncovered by the slide valve 63. The slide valve seat 65 is also provided with a port 70 leading through a pipe connection 71 and passage 19 to the exhaust port 21 of the triple valve and with a port 72 leading to an atmospheric port 73. The ports 70 and 72 are, in the release position of the valve device placed in communication with one another through a cavity 74 in the slide valve 63, this communication being interrupted for all other positions of the slide valve 63.

The lower compartment 75 below the lower diaphragm 58 is in open communication with the atmosphere through opening 76.

In operation, during an application of the brakes with this modified form of my invention, the brake cylinder pressure obtaining in the upper compartment 59 and acting upon the upper and larger diaphragm 57 moves the two diaphragms 57 and 58 and the slide valve 63 to their lower positions in which the slide valve 63 covers the ports 67 and 66 leading to the triple valve chamber 5 and control chamber 15, thereby cutting off their communication with one another and with the middle chamber 61 leading to the auxiliary reservoir. In this position of the slide valve 63 the communication by way of the cavity 74 in the slide valve 63 between the ports 70 and 72 leading to the exhaust port 19 from the triple valve and to the atmospheric port 73 is also interrupted.

This position of the slide valve 63 is maintained during the braking application and also during a graduated release of the brakes, which is effected in the same manner as described in connection with the apparatus shown in Fig. 1 of the drawings, until the brake cylinder pressure has been reduced to an extent sufficient to permit the auxiliary reservoir pressure in the middle compartment 61 to move the diaphragms 57 and 58 and slide valve 63 to their upper or release position shown in Figure 2 in which the cavity 74 in the slide valve 63 establishes communication between the port 70 leading to the exhaust port 19 from the triple valve and the atmospheric port 72, so that the brake cylinder 10 is thus put into communication with the atmosphere through the triple valve and is completely vented.

It will be understood that the movement of the slide valve 63 from one to the other of its two operative positions depends solely upon the relation between the brake cylinder pressure and the auxiliary reservoir pressure and by suitably proportioning the effective areas of the diaphragms 57 and 58 these movements of the slide valve 63 can be arranged to occur at any predetermined relations between the two pressures above referred to.

Figure 3:
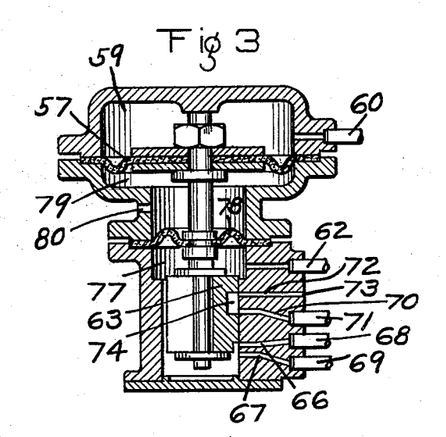

In Fig. 3 of the drawings is shown another form of valve device for controlling the final venting of brake cylinder 10, this form having a compartment or chamber 77 below a lower diaphragm 78, said chamber containing the slide valve 63 and being in communication through the pipe connection 62 with the auxiliary reservoir 17, the middle compartment 79 between the two diaphragms 57 and 78 being open to the atmosphere through an opening 80 so that the auxiliary reservoir pressure acts only upon the lower diaphragm 78 instead of differentially upon both diaphragms as in the construction of Figure 2 above described.

In other respects the operation of the slide valve 63 to control the various ports is the same as that already described with reference to Figure 2 and will be evident without further explanation.

Figure 4:
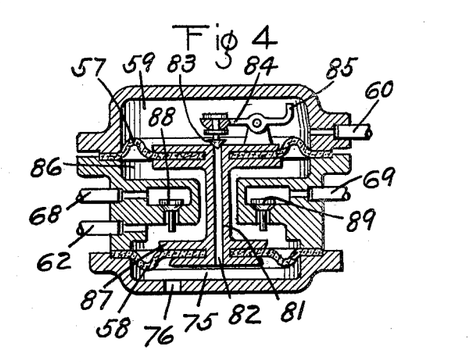
Figure 5:
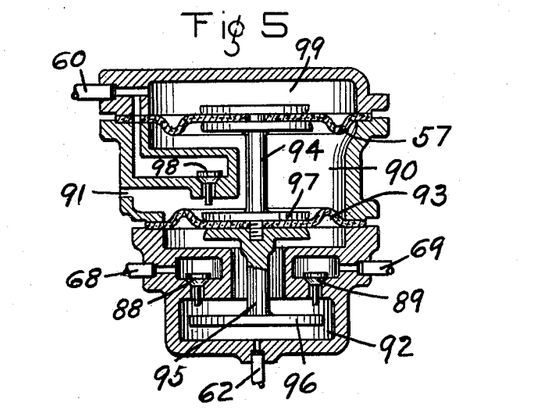

In the further modification of my invention shown in Figures 4 and 5, the slide valve 63 employed in the constructions above described is replaced by valves of the poppet type. In the construction shown in Figure 4 the two diaphragms 57 and 58 are mechanically coupled together by a common stem 81 having a longitudinal passage 82 therein adapted to establish communication between the upper chamber 59 leading to the brake cylinder 10 and the lower chamber 75 leading to the atmosphere through opening 76.

A poppet valve 83 controlling communication between the upper end of the passage 82 and the upper chamber 59 is carried by one end of a rocking arm 84 mounted on the upper side of the upper diaphragm 57, the other end of this arm being upturned as indicated at 85, so that when the diaphragm 57 moves upwards from its application position shown in Figure 4 to its release position, the upturned end 85 of the rocking arm 84 engages with the top of the upper chamber 59 and the valve 83 carried by the arm 84 is thus opened, thereby permitting the final venting of the brake cylinder by way of the pipe connection 60, chamber 59, passage 82, chamber 75, and opening 76.

The middle chamber 86 between the diaphragms 57 and 58 is in permanent communication with the auxiliary reservoir 17 through the pipe connection 62, and the foot 87 of the stem 81 which is in contact with the upper face of the lower diaphragm 58 is, when the device is in its release position arranged to engage with and open two poppet valves 88 and 89 controlling communication between the middle chamber 86 and the pipe connections 68 and 69 leading to the control chamber and to passage 31 from the triple valve chamber 5.

In operation, it will be evident that during an application of the brakes and during a subsequent graduated release, the parts of the valve device will occupy the position shown in Figure 4 in which communication between the auxiliary reservoir, control chamber and triple valve chamber 5 and between the brake cylinder and the atmosphere is cut off, at the valves 83, 88 and 89 which are all closed.

As soon however, as the brake cylinder pressure in the chamber 59 has been sufficiently reduced during the release of the brakes, the diaphragms 57 and 58 and their stem 81 will move to their upper positions under the action of the auxiliary reservoir pressure in the chamber 86 with the result that the valves 83, 88 and 89 will be opened as above described. Communication is thereby established between the brake cylinder chamber 59 through the open valve 83 and the atmospheric chamber 75 to permit the final venting of the brake cylinder while the opening of the valves 88 and 89 establishes communication between the auxiliary reservoir and the control chamber and the triple valve chamber 5.

In the construction shown in Figure 5 the middle chamber 90 is in open communication with the atmosphere through a port 91 and the lower chamber 92 is in communication with the auxiliary reservoir through a pipe connection 62. The diaphragms 57 and 93 are provided with a stem 94 coupling the two diaphragms together and having an extension 95 below the lower diaphragm 93. The lower end of the extension 95 is provided with a head or plate 96 adapted when the device is in its release position to engage with and to open the poppet valves 88 and 89, establishing communication between the lower chamber 92 and the control reservoir and triple valve chamber 5, respectively, through the corresponding pipe connections 68 and 69.

Under these conditions the foot 97 of the stem 94 in contact with the upper face of the lower diaphragm 93 similarly engages with and opens a poppet valve 98, establishing communication between the middle chamber 90 and the upper chamber 99 leading through pipe 60 to the brake cylinder 10, the valve 98 in this construction performing the function of valve 83 in the construction shown in Fig. 4.

The operation of this form of the valve device is the same as that of the device of Figure 5 above described.

The invention is evidently not limited to the particular constructional arrangements above described and illustrated by way of example which may be modified in various respects without exceeding the scope of the invention.

Having now described my invention, what I claim as new and desire to secure by Letters Patent, is:

1. In a fluid pressure brake, the combination with a brake pipe, a brake cylinder, and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure from said brake pipe to said auxiliary reservoir, of valve means operative by an increase in auxiliary reservoir pressure to vent fluid under pressure from said brake cylinder to the atmosphere, and a valve device operative after said valve means has reduced the brake cylinder pressure to a predetermined degree to also vent fluid under pressure from said brake cylinder, and differential pressure means for operating said valve means.

2. In a fluid pressure brake, the combination with a brake pipe, a brake cylinder, and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure from said brake pipe to said auxiliary reservoir, of a valve device operated by an increase in auxiliary reservoir pressure for initiating the release of fluid under pressure from said brake cylinder to the atmosphere, a valve for releasing a low pressure from said brake cylinder independently of said valve device, and pressure means for operating said valve upon a predetermined reduction in brake cylinder pressure, said valve device being operated by auxiliary reservoir pressure upon a complete release of fluid under pressure from said brake cylinder to maintain an atmospheric opening to said brake cylinder, and said valve being operated by said pressure means when said brake cylinder pressure is below a predetermined degree to also maintain an atmospheric opening to said brake cylinder independently of said valve device.

3. In a fluid pressure brake, the combination with a brake pipe, a brake cylinder, and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure from said brake pipe to said auxiliary reservoir and to connect said brake cylinder to a passage, valve means operated by an increase in auxiliary reservoir pressure to cut off the supply of fluid from said triple valve device to said auxiliary reservoir and to open communication from said passage to the atmosphere to vent fluid under pressure from said brake cylinder, said valve means being operative upon a reduction in brake cylinder pressure in proportion to the increase in auxiliary reservoir pressure for closing said communication and for opening communication from said triple valve device to said auxiliary reservoir, and a valve device controlled by brake cylinder pressure and operative upon a predetermined reduction in brake cylinder pressure for opening another communication from said brake cylinder to the atmosphere and for supplying fluid under pressure from said triple valve device to said auxiliary reservoir independently of said valve means.

4. In a fluid pressure brake, the combination with a brake pipe, a brake cylinder, and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure from said brake pipe to said auxiliary reservoir and to connect said brake cylinder to a passage, a graduated release device comprising a supply valve for controlling the flow of fluid under pressure from said triple valve device to said auxiliary reservoir and a vent valve for releasing fluid at brake cylinder pressure from said passage to the atmosphere, a source of constant pressure for controlling the operation of said graduated release device, said graduated release valve device being operated by an increase in auxiliary reservoir pressure to close said supply valve and to open said vent valve and upon a reduction in brake cylinder pressure proportional to the increase in auxiliary reservoir pressure to close said vent valve and open said supply valve, and valve means controlled by brake cylinder pressure and operative upon a predetermined reduction in brake cylinder pressure to supply fluid under pressure to said auxiliary reservoir and to said source and to release fluid at brake cylinder pressure from said passage.

5. In a fluid pressure brake, the combination with a brake pipe, a brake cylinder and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure from said brake pipe to said auxiliary reservoir and to connect said brake cylinder to a passage through which fluid under pressure is vented from said brake cylinder to effect a release of the brakes, a control reservoir, valve means controlled by the pressure of fluid in said brake cylinder for supplying fluid under pressure to said control reservoir, a valve device operated by the differential pressures of the brake cylinder and auxiliary reservoir and controlled by the pressure of fluid in said control reservoir for controlling communication from said passage to the atmosphere, said valve device comprising a valve independently operated by auxiliary reservoir pressure for opening communication from said control reservoir to said auxiliary reservoir.

6. In a fluid pressure brake, the combination with a brake pipe, a brake cylinder and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure from said brake pipe to said auxiliary reservoir and to connect said brake cylinder to a passage through which fluid under pressure is vented from said brake cylinder to effect a release of the brakes, a control reservoir, valve means controlled by the pressure of fluid in said brake cylinder for supplying fluid under pressure to said control reservoir and for opening said passage to the atmosphere to effect a release of the brakes, and a valve device operatively controlled by the pressure of fluid in said control reservoir and operative by an increase in auxiliary reservoir pressure to also open said passage to the atmosphere to effect a release of the brakes, said valve device comprising a valve operated by an increase in auxiliary reservoir pressure over the pressure of fluid in said control reservoir for opening communication between said reservoirs for permitting equalization of pressures therein.

7. In a fluid pressure brake, the combination with a brake pipe, a brake cylinder, and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure from said brake pipe to said auxiliary reservoir and to connect said brake cylinder to a passage through which fluid under pressure is vented from said brake cylinder in effecting a release of the brakes, a control reservoir, valve means subject to brake cylinder pressure and operative when the brakes are released to supply fluid under pressure from said triple valve device to said control reservoir, and operative by an increase in brake cylinder pressure to cut off said supply, a valve device controlled by the pressure in said control reservoir and operative in accordance with the increase in auxiliary reservoir pressure to vent fluid at brake cylinder pressure from said passage, said valve device comprising a supply valve for controlling the supply of fluid from said triple valve device to said auxiliary reservoir, a vent valve movable to an open position for venting fluid at brake cylinder pressure from said passage when the supply valve is moved to closed position and movable to a closed position when said supply valve is moved to an open position, a plurality of movable abutments, one being subject to the pressure of fluid in said control reservoir, for controlling the operation of said valves, and a check valve for preventing flow of fluid from said control reservoir to said auxiliary reservoir.

8. In a fluid pressure brake, the combination with a brake pipe, a brake cylinder, and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure from said brake pipe to said auxiliary reservoir and to connect said brake cylinder to a passage through which fluid under pressure is vented from said brake cylinder in effecting a release of the brakes, a control reservoir, valve means subject to brake cylinder pressure and operative when the brakes are released to supply fluid under pressure from said triple valve device to said control reservoir, and operative by an increase in brake cylinder pressure to cut off said supply, a valve device controlled by the pressure in said control reservoir and operative in accordance with the increase in auxiliary reservoir pressure to vent fluid at brake cylinder pressure from said passage, said valve device comprising a supply valve for controlling the supply of fluid from said triple valve device to said auxiliary reservoir, a vent valve movable to an open position for venting fluid at brake cylinder pressure from said passage when the supply valve is moved to closed position and movable to a closed position when said supply valve is moved to an open position, a plurality of movable abutments, one being subject to the pressure of fluid in said control reservoir, for controlling the operation of said valves, a stem operatively connecting said abutments and provided with a valve seat, and a valve carried by one of said abutments and cooperating with said seat to prevent flow of fluid from said control reservoir to said auxiliary reservoir upon a reduction in auxiliary reservoir pressure in effecting an application of the brakes.

9. In a fluid pressure brake, the combination with a brake pipe, a brake cylinder, and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to connect said brake cylinder to a passage through which fluid under pressure flows from the brake cylinder to effect a release of the brakes, a control reservoir, a graduated release device operated by the pressure of fluid in said control reservoir and the differential pressures of the brake cylinder and auxiliary reservoir for graduating the release of fluid from said passage leading to said brake cylinder and operated by an increase in auxiliary reservoir pressure to cut off the supply of fluid under pressure from said triple valve device to said auxiliary reservoir, valve means operated by fluid under pressure from said brake cylinder upon a predetermined reduction in pressure in said brake cylinder for opening said passage to the atmosphere to effect a complete release of fluid under pressure from said brake cylinder passage, and for supplying fluid under pressure to said control reservoir and to said auxiliary reservoir independently of said graduated release device, said valve means being operated by an increase in brake cylinder pressure above a predetermined degree to close the atmospheric connection to said passage and to cut off the supply of fluid under pressure to each of said reservoirs.

10. In a fluid pressure brake, the combination with a brake pipe, a brake cylinder, and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to connect said brake cylinder to a passage through which fluid under pressure flows from the brake cylinder to effect a release of the brakes, a control reservoir, a graduated release device operated by the pressure of fluid in said control reservoir and the differential pressures of the brake cylinder and the auxiliary reservoir for graduating the release of fluid from said passage leading to said brake cylinder and operated by an increase in auxiliary reservoir pressure to cut off the supply of fluid under pressure from said triple valve device to said auxiliary reservoir, and valve means operated by auxiliary reservoir pressure when the brake cylinder pressure is reduced to a predetermined degree for opening said passage to the atmosphere to effect a complete release of fluid under pressure from said brake cylinder passage, and for supplying fluid under pressure to said control reservoir and to said auxiliary reservoir independently of said graduated release device, said valve means being operated by an increase in brake cylinder pressure above a predetermined degree to close the atmospheric connection to said passage and to cut off the supply of fluid under pressure to each of said reservoirs.

11. In a fluid pressure brake, the combination with a brake pipe, a brake cylinder, and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to connect said brake cylinder to a passage through which fluid under pressure flows from the brake cylinder to effect a release of the brakes, a control reservoir, a graduated release device operated by the pressure of fluid in said control reservoir and the differential pressures of the brake cylinder and the auxiliary reservoir for graduating the release of fluid from said passage leading to said brake cylinder and operated by an increase in auxiliary reservoir pressure to cut off the supply of fluid under pressure from said triple valve device to said auxiliary reservoir, and valve means having a normal position for opening said passage to the atmosphere to effect a complete release of the brakes and for supplying fluid under pressure to said control reservoir and to said auxiliary reservoir when the brake cylinder pressure is reduced to a predetermined degree, said valve means comprising a slide valve, a piston for operating said slide valve and having a chamber at one side normally open to the atmosphere, a spring for shifting said piston to its normal position, and a valve subject to brake cylinder pressure and operated upon a predetermined increase in brake cylinder pressure to close the atmospheric connection to said chamber and to supply fluid at brake cylinder pressure to said chamber for shifting said piston and slide valve to another position for closing the atmospheric connection to said passage and for cutting off the supply of fluid under pressure to said reservoirs.

12. In a fluid pressure brake, the combination with a brake pipe, a brake cylinder, and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to connect said brake cylinder to a passage through which fluid under pressure flows from the brake cylinder to effect a release of the brakes, a control reservoir, a graduated release device operated by the pressure of fluid in said control reservoir and the differential pressures of the brake cylinder and the auxiliary reservoir for graduating the release of fluid from said passage leading to said brake cylinder and operated by an increase in auxiliary reservoir pressure to cut off the supply of fluid under pressure from said triple valve device to said auxiliary reservoir, and valve means having a normal position for opening said passage to the atmosphere to effect a complete release of the brakes and for supplying fluid under pressure to said control reservoir and to said auxiliary reservoir when the brake cylinder pressure is reduced to a predetermined degree and having an application position for closing the atmospheric connection from said passage and for cutting off the supply of fluid under pressure to said reservoirs, said valve means comprising a slide valve, a pair of connected fluid pressure operated abutments for operating said slide valve from one to the other of said positions, said abutments having differential areas subject to variations in auxiliary reservoir pressure, one of said abutments being also subject to variations in brake cylinder pressure.

13. In a fluid pressure brake, the combination with a brake pipe, a brake cylinder, and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to connect said brake cylinder to a passage through which fluid under pressure flows from the brake cylinder to effect a release of the brakes, a control reservoir, a graduated release device operated by the pressure of fluid in said control reservoir and the differential pressures of the brake cylinder and the auxiliary reservoir for graduating the release of fluid from said passage leading to said brake cylinder and operated by an increase in auxiliary reservoir pressure to cut off the supply of fluid under pressure from said triple valve device to said auxiliary reservoir, and valve means having a normal position for opening said passage to the atmosphere to effect a complete release of the brakes and for supplying fluid under pressure to said control reservoir and to said auxiliary reservoir when the brake cylinder pressure is reduced to a predetermined degree and having an application position for closing the atmospheric connection from said passage and for cutting off the supply of fluid under pressure to said reservoirs, said valve means comprising a slide valve, and a pair of connected abutments, one of which is subject to variations in auxiliary reservoir pressure and the other of which is subject to variations in brake cylinder pressure, for operating said slide valve.

14. In a fluid pressure brake, the combination with a brake pipe, a brake cylinder, and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to connect said brake cylinder to a passage through which fluid under pressure flows from the brake cylinder to effect a release of the brakes, a control reservoir, a graduated release device operated by the pressure of fluid in said control reservoir and the differential pressures of the brake cylinder and the auxiliary reservoir for graduating the release of fluid from said passage leading to said brake cylinder and operated by an increase in auxiliary reservoir pressure to cut off the supply of fluid under pressure from said triple valve device to said auxiliary reservoir, and valve means having a normal position for opening said passage to the atmosphere to effect a complete release of the brakes and for supplying fluid under pressure to said control reservoir and to said auxiliary reservoir when the brake cylinder pressure is reduced to a predetermined degree, said valve means comprising a plurality of poppet valves, and a pair of movable abutments for operating said poppet valves, said movable abutments having differential areas subject to variations in the pressure of fluid in said auxiliary reservoir, one of said abutments being also subject to variations in the pressure of fluid in said brake cylinder.

15. In a fluid pressure brake, the combination with a brake pipe, a brake cylinder and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is adapted to be vented from said brake cylinder, a graduated release valve device operated in accordance with the increase in auxiliary reservoir pressure to vent fluid under pressure from said brake cylinder through said communication, valve means operative to effect a final release of fluid under pressure from said brake cylinder comprising a movable abutment having a chamber at one side supplied with fluid under pressure from said brake cylinder through said communication and a chamber at the opposite side supplied with fluid under pressure from said brake cylinder, and a valve operative upon a predetermined reduction in brake cylinder pressure for venting fluid under pressure from the last mentioned chamber for effecting the operation of said valve means.

16. In a fluid pressure brake, the combination with a brake pipe, a brake cylinder and an auxiliary reservoir, of a triple valve device operative upon a reduction in brake pipe pressure to supply fluid under pressure from said auxiliary reservoir to said brake cylinder to effect an application of the brakes and operative upon an increase in brake pipe pressure to supply fluid under pressure to said auxiliary reservoir and to establish a communication through which fluid under pressure is adapted to be vented from said brake cylinder, a graduated release valve device operated in accordance with the increase in auxiliary reservoir pressure to vent fluid under pressure from said brake cylinder through said communication, valve means operative to effect a final release of fluid under pressure from said brake cylinder, and a valve device controlled by the reduction in brake cylinder pressure for effecting the operation of said valve means.

ANSELME NEVEU.